(12) United States Patent
Mercian et al.

(10) Patent No.: US 11,553,260 B2
(45) Date of Patent: Jan. 10, 2023

(54) OPTICAL NETWORK HAVING COMBINED CIRCUIT-PACKET SWITCH ARCHITECTURE

(71) Applicant: Hewlett Packard Enterprise Development LP, Houston, TX (US)

(72) Inventors: Anu Mercian, Santa Clara, CA (US); Terrel Morris, Garland, TX (US); Jean Tourrilhes, Mountain View, CA (US); Derek Spock, Nashua, NH (US); Puneet Sharma, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/655,032

(22) Filed: Mar. 16, 2022

(65) Prior Publication Data

US 2022/0210528 A1 Jun. 30, 2022

Related U.S. Application Data

(62) Division of application No. 16/931,348, filed on Jul. 16, 2020, now Pat. No. 11,297,404.

(51) Int. Cl.
*H04Q 11/00* (2006.01)
*H04B 10/40* (2013.01)

(52) U.S. Cl.
CPC ......... *H04Q 11/0066* (2013.01); *H04B 10/40* (2013.01); *H04Q 11/0005* (2013.01);
(Continued)

(58) Field of Classification Search
None
See application file for complete search history.

(56) References Cited

U.S. PATENT DOCUMENTS

| 8,965,203 B1 | 2/2015 | Vahdat et al. |
| 9,020,347 B2 | 4/2015 | Koka et al. |
| 10,303,648 B1 | 5/2019 | Das et al. |

(Continued)

FOREIGN PATENT DOCUMENTS

| CN | 105959163 A | 9/2016 |
| CN | 109314672 A | 2/2019 |

OTHER PUBLICATIONS

Binhao Wang, "Modeling of Silicon Photonic Devices for Optical Interconnect Transceiver Circuit Design", Jul. 12, 2017, pp. 187-210.
(Continued)

*Primary Examiner* — Darren E Wolf
(74) *Attorney, Agent, or Firm* — Hewlett Packard Enterprise Patent Department

(57) ABSTRACT

An optical network includes top networking ports coupled to a packet switch, first media converters, second media converters, and bottom networking ports. The first media converters are coupled to top networking ports, each of the first media converters including a first ASIC transceiver that has a circuit switch function. The second media converters are coupled to the first media converter via optical cables to receive the optical signals. Each of the second media converters includes a second ASIC transceiver that has a circuit switch function. The bottom networking ports are coupled to the second media converters. The first ASIC transceiver and the second ASIC transceiver are configured to transmit a signal from one of the top networking ports to any one of the bottom networking ports, and transmit a signal from one of the bottom networking ports to any one of the top networking ports.

7 Claims, 9 Drawing Sheets

(52) U.S. Cl.
CPC ............... *H04Q 2011/009* (2013.01); *H04Q 2011/0039* (2013.01); *H04Q 2011/0041* (2013.01); *H04Q 2011/0081* (2013.01); *H04Q 2011/0086* (2013.01)

(56) References Cited

U.S. PATENT DOCUMENTS

| | | | | |
|---|---|---|---|---|
| 2007/0014574 | A1* | 1/2007 | Yada | H04B 10/2916 398/71 |
| 2012/0271930 | A1* | 10/2012 | Tsuchida | H04L 49/40 709/223 |
| 2013/0202286 | A1* | 8/2013 | Boyd | H04B 10/032 398/5 |
| 2014/0119727 | A1* | 5/2014 | Ousley | H04Q 11/0005 398/45 |
| 2014/0153584 | A1* | 6/2014 | Finkelstein | H04L 5/0064 370/468 |
| 2014/0193161 | A1* | 7/2014 | In De Betou | H04Q 11/0062 398/154 |
| 2015/0071632 | A1 | 3/2015 | Koka et al. | |
| 2016/0266335 | A1* | 9/2016 | Durrant | G02B 6/4251 |

OTHER PUBLICATIONS

Broadcom Blogs, "At a Glance: Tomahawk® 3 is the first 12.8 Tb/s chip to achieve mass production", available online at <https://www.broadcom.com/blog/at-a-glance-tomahawk-3-is-the-first-12-8-tb-s-chip-to-achieve-mass-production>, Jan. 11, 2019, 3 pages.

Liu et al., "Scheduling Techniques for Hybrid Circuit/packet Networks", Dec. 1-4, 2015, 13 pages.

Paul Teich et al., "HPE Switches on 'The Machine' to Change Data Center Architecture", available online at <https://www.forbes.com/sites/tiriasresearch/2017/01/10/hpe-welcome-to-the-machine/#37843a8475fa>, Jan. 10, 2017, 4 pages.

Rastegarfar, H., "Optical Switching in Next-Generation Data Centers", 2014, 139 pages.

Saridis, G. et al., "Lightness: A Function-Virtualizable Software Defined Data Center Network with All-Optical Circuit/Packet Switching", Dec. 2015, pp. 1-8.

Wikipedia, "I²C", available online at <https://en.wikipedia.org/w/index.php?title=I%C2%B2C&oldid=966557676>, Jul. 7, 2020, 16 pages.

\* cited by examiner

OPTICAL NETWORK HAVING COMBINED CIRCUIT-PACKET SWITCH ARCHITECTURE

CROSS-REFERENCE TO RELATED APPLICATIONS

This application is a divisional application of and claims priority to application Ser. No. 16/931,348, filed on Jul. 16, 2020, the contents of which are hereby incorporated by reference in their entireties.

DESCRIPTION OF RELATED ART

Data center topology management is laborious, time-consuming and expensive due to the fact that cabling and recabling is generally performed by human. The deployments and applications in datacenter are highly dynamic, and therefore the topology is often overprovisioned to satisfy the various system needs.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Hyperscale composable datacenter architecture demands high bandwidth networking. All switches are known to have limited bandwidths. For example, 250 I/O pins of a switch can be configured as 32 (of 100 Gb/s) or 128 (of 25 Gb/s) ports depending on port width and desired bandwidth. As a result, connectivity is provided by a fabric of switches, and adding new bandwidth or reconfiguring existing bandwidth often requires re-wiring large sections of the data center. Topology reconfiguration involves reconnecting optical cables by hand, which requires significant time and cost. This also leads to excessive cabling, for example, for a data center with thousands of servers and hundreds of Top of Rack (TORS) switches. Additionally, traditional static networks are not optimized as the workloads change over time, leading to either over provisioning, at the expense of cost, or under provisioning at the expense of performance.

Techniques disclosed herein provide optical networks that are designed to provide high bandwidth and simplified cabling. In the optical network, media converters are employed. The media converters have the pin-swap capability/functionality that can be used as a circuit switch. Combined with a packet switching function, the techniques provide reconfigurable topologies that can re-provision/re-allocate bandwidth as needed. This enables seamless transition between packet and circuit switches that can provide benefits such as lowering cabling cost and offering flexible bandwidth to servers.

Figure 1:
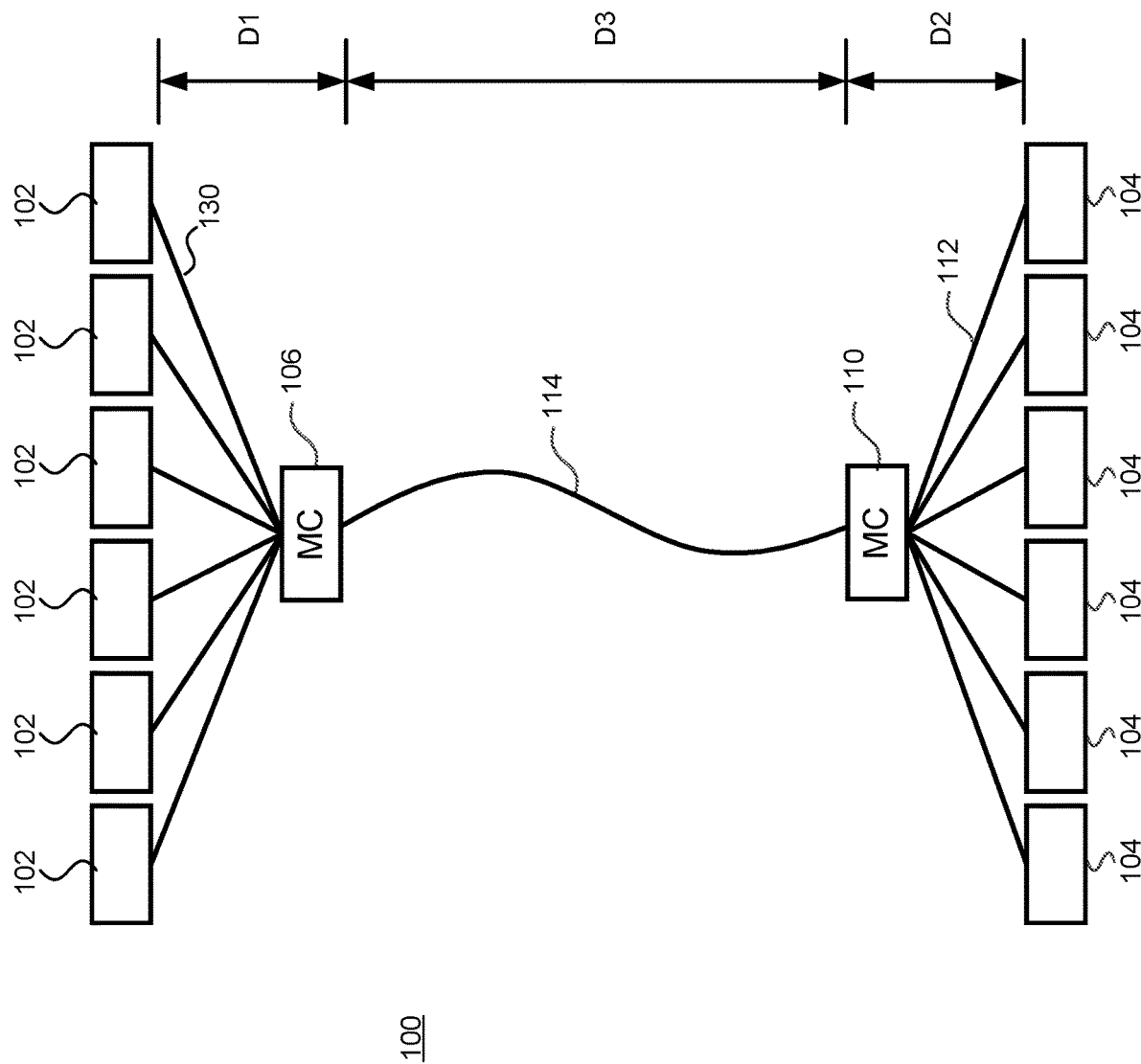
FIG. 1 illustrates an optical network according to one example embodiment.

Reference is now made to FIG. 1. FIG. 1 illustrates an optical network 100 according to one example embodiment. The optical network 100 includes a plurality of top networking ports 102 and a plurality of bottom networking ports 104. The top networking ports 102 may be part of a TOR switch or switches or other network devices such as a router. The bottom networking ports 104 may be ports of servers disposed in a server rack or server racks or ports of one or more network devices such as a router. The top networking ports 102 are coupled to a first media converter (MC) 06 via electrical cables 108. The bottom networking ports 104 are coupled to a second media converter 110 via electrical cables 112. The first media converter 106 and the second media converter 110 are connected to each other via one or more optical cables 114 (one shown in FIG. 1).

The first media converter 106 is disposed at a distance D1 from the top networking ports 102, while the second media converter 106 is disposed at a distance D2 from the bottom networking ports 104. The first media converter 106 and the second media converter 110 are spaced apart by a distance D3. In some embodiments, D3 is greater than D1, which is about equal to D2. As a non-limiting example, D1 and D2 are about 0.5 meters at the maximum, while D3 is about 30 meters at the maximum. This configuration allows deployment flexibility when the topography of FIG. 1 is applied to a data center. For example, longer optical cables to replace electrical cables in the optical network 100 enable fast communication between the bottom networking ports 104 and the top networking ports 102.

The first media converter 106 includes a first application-specific integrated circuit (ASIC) transceiver configured to convert electrical signals from the plurality of top networking ports into optical signals. The optical signals are then transmitted via the optical cable 114 to the second media converter 110. The second media converter 110 includes a second ASIC transceiver configured to convert the optical signals into electrical signals and transmits the electrical signals to respective bottom networking ports 104 via the electrical cables 112.

The signal transmission from the bottom networking ports 104 to the top networking ports 102 follows similar mechanisms. A bottom networking port 104 transmits electrical signals to the second media converter 110 via the electrical cables 112. The second ASIC transceiver of the second media converter 110 is configured to convert the electrical signals from the bottom networking ports into optical signals and transmit the optical signals to the first media converter 106 via the optical cable 114. The first ASIC transceiver of the first media converter 106 is configured to convert the optical signals from the second media converter 110 into electrical signals and transmit the electrical signals to respective top networking ports 102 via the electrical cables 108.

Each of the first ASIC transceiver and the second ASIC transceiver has a circuit switch function. The circuit switch function allows the first ASIC transceiver and the second ASIC transceiver to transmit a signal from one of the top networking ports to any one of the bottom networking ports, and transmit a signal from one of the bottom networking ports to any one of the top networking ports. These techniques provide better flexibility in routing signal packets or for failover cushion. For example, when one of the top networking ports 102 is out of service, the signals from the bottom networking ports 104 handled by the out-of-service switch port may be switched by the first ASIC transceiver of the first media converter 106 to another switch port. As another non-limiting example, when one of the electrical cables 108 is disconnected, the signals from the bottom networking ports 104 that should be transmitted to a switch port via the disconnected electrical cable may be switched by the first ASIC transceiver of the first media converter 106 to another switch port via a different electrical cable 108.

Figure 2:
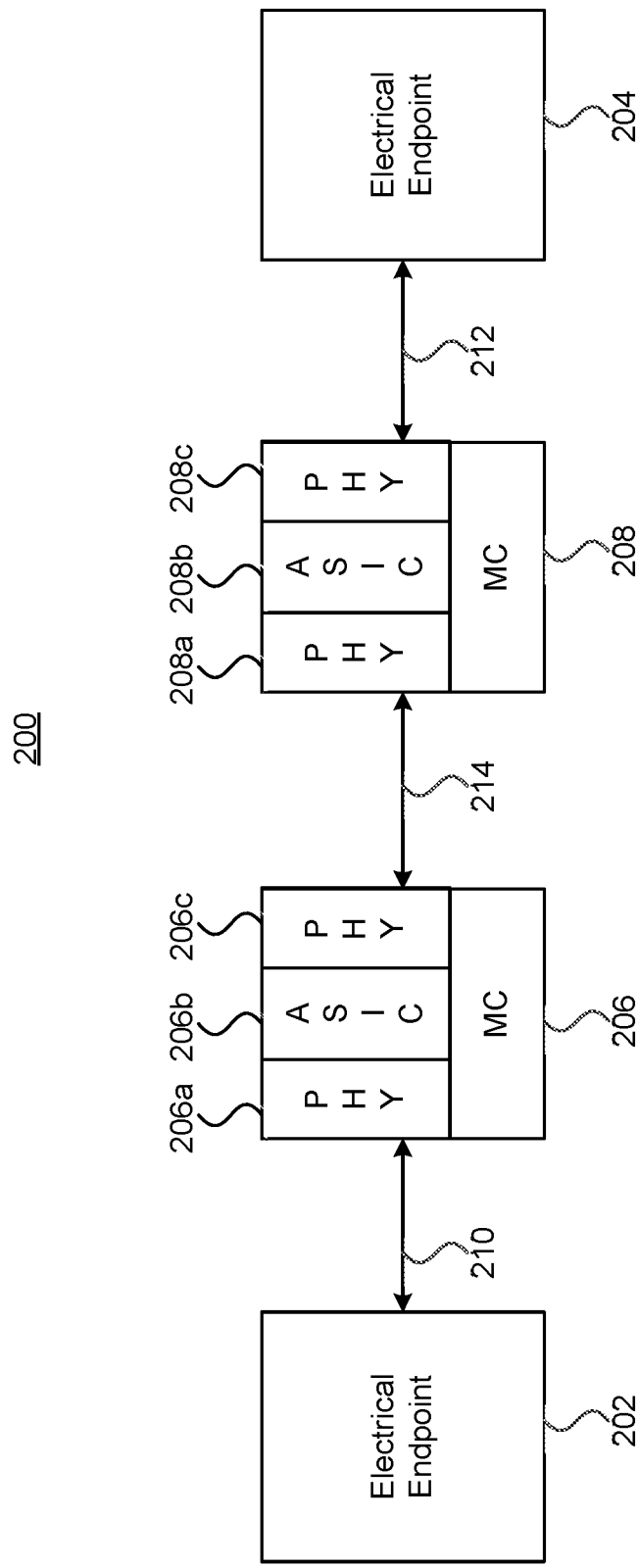
FIG. 2 is a block diagram illustrating an optical network according to one example embodiment.

FIG. 2 is a block diagram illustrating an optical network 200 according to one example embodiment. The optical network 200 includes a first electrical endpoint 202, a second electrical endpoint 204, a first media converter 206, and a second media converter 208. The first electrical endpoint 202 is connected to the first media converter 206 via a first electrical link 210. The second electrical endpoint 204 is connected to the second media converter 208 via a second electrical link 212. The first media converter 206 and the second converter 208 are connected to each other via an optical link 214. It should be understood that although FIG. 2 shows that each of the first media converter 206 and the second converter 208 is connected to one electrical endpoint, this disclosure is not so limited. Each of the first media converter 206 and the second converter 208 can be connected to a plurality of electrical endpoints. The electrical endpoints may be, for example, top networking ports, bottom networking ports, or other network components.

The first media converter 206 includes a first physical interface (PHY) 206a facing the first electrical endpoint 202, a second physical interface 206b facing the second media converter 208, and a first ASIC transceiver 206c. The second media converter 208 includes a third physical interface 208a facing the first media converter 206, a fourth physical interface 208b facing the second electrical endpoint 204, and a second ASIC transceiver 208c. The first ASIC transceiver 206c and the second ASIC transceiver 208c are configured to convert optical signals into electrical signals or vice versa. The first physical interface 206a and fourth physical interface 208b are electrical interfaces that may support protocols such as Ethernet, PCI Express, InfiniBand, Gen-Z link or other electrical communication protocols, and can be connected to servers or switches. The second physical interface 206b and the third physical interface 208a are optical interfaces that support wavelength-division multiplexing (WDM) techniques.

As a non-limiting example, the second physical interface 206b and the third physical interface 208a are configured to use Coarse Wavelength Division Multiplexing (CWDM) that can combine 4 links on each of 6 fibers using different colors. In some embodiments, the 6 fibers can be bundled in a single ribbon cable. The first physical interface 206a and fourth physical interface 208b support 24 lanes that can be used for the above protocols. For example, when used for Ethernet, the first physical interface 206a and fourth physical interface 208b can be configured for 25 Gb/s (non-return-to-zero (NRZ)) or 50 Gb/s (pulse amplitude modulation with 4 levels (PAM4)) electrical lanes, such that they can optimally connect to 6 QSFP-56 (Quad Small Form-factor Pluggable) ports or 3 QSFP-DD (double density) ports and support up to 1.2 Tb/s on a single ribbon cable. In some embodiments, the first media converter 206 and the second media converter 208 can be configured to perform optical operations, such as auto-negotiation, link training, self-test, and execution of eye safety measures.

Figure 3:
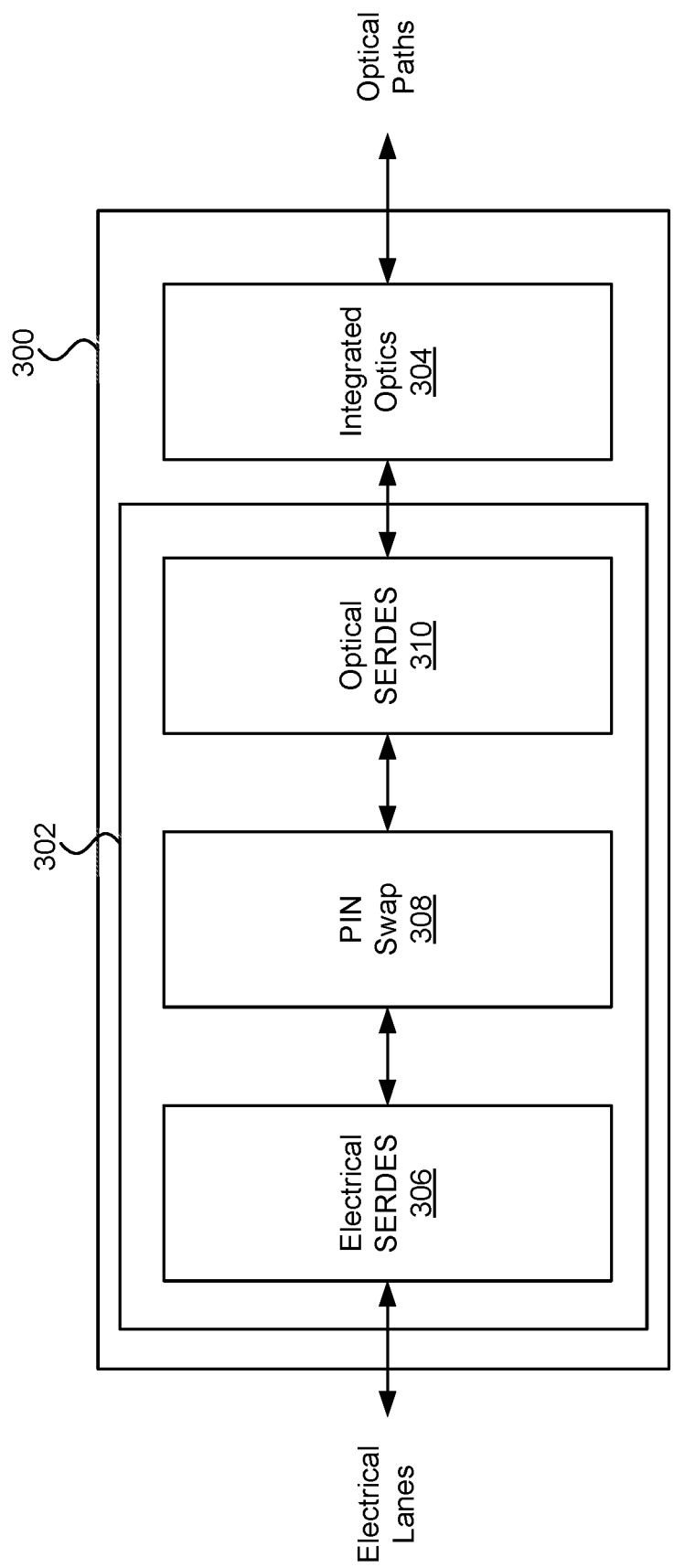
FIG. 3 is a block diagram of an ASIC transceiver according to one example embodiment.

FIG. 3 is a block diagram of an ASIC transceiver 300 according to one example embodiment. The ASIC transceiver 300 includes an ASIC 302 and an integrated optics 304. The ASIC 302 includes an electrical serializer/deserializer (SERDES) 306, a pin swap circuit 308, and an optical SERDES 310. The electrical SERDES 306 is coupled to its left to electrical lanes to receive electrical signals from an electrical endpoint. The electrical signals are serialized at the electrical SERDES 306 and provided to the pin swap circuit 308. The pin swap circuit 308 can be programmed by an external controller to perform a circuit switch function that can map any electrical lanes connected to the electrical SERDES 306 to any optical path connected to the integrated optics 304. The electrical signals then go through the optical SERDES 310 and are converted by the integrated optics 304 into optical signals to output to the optical paths.

The integrated optics 304 may employ laser technologies for transmitting optical signals. As a non-limiting example, a vertical-cavity surface-emitting laser (VCSEL) technology may be implemented in the integrated optics 304. The pin swap circuit 308 can be configured for circuit switch. When a VCSEL or an optical fiber is faulty, an electrical lane can be rerouted to a healthy optical path. With the circuit switch function at the pin swap circuit 308, if enough spare routes are re-allocated, full connectivity in the optical network can be restored. As such, the ASIC 302 can be used for fault tolerance or to reallocate bandwidth in the optical network. As another non-limiting example, the integrated optics 304 may be silicon photonics elements.

Figure 4:
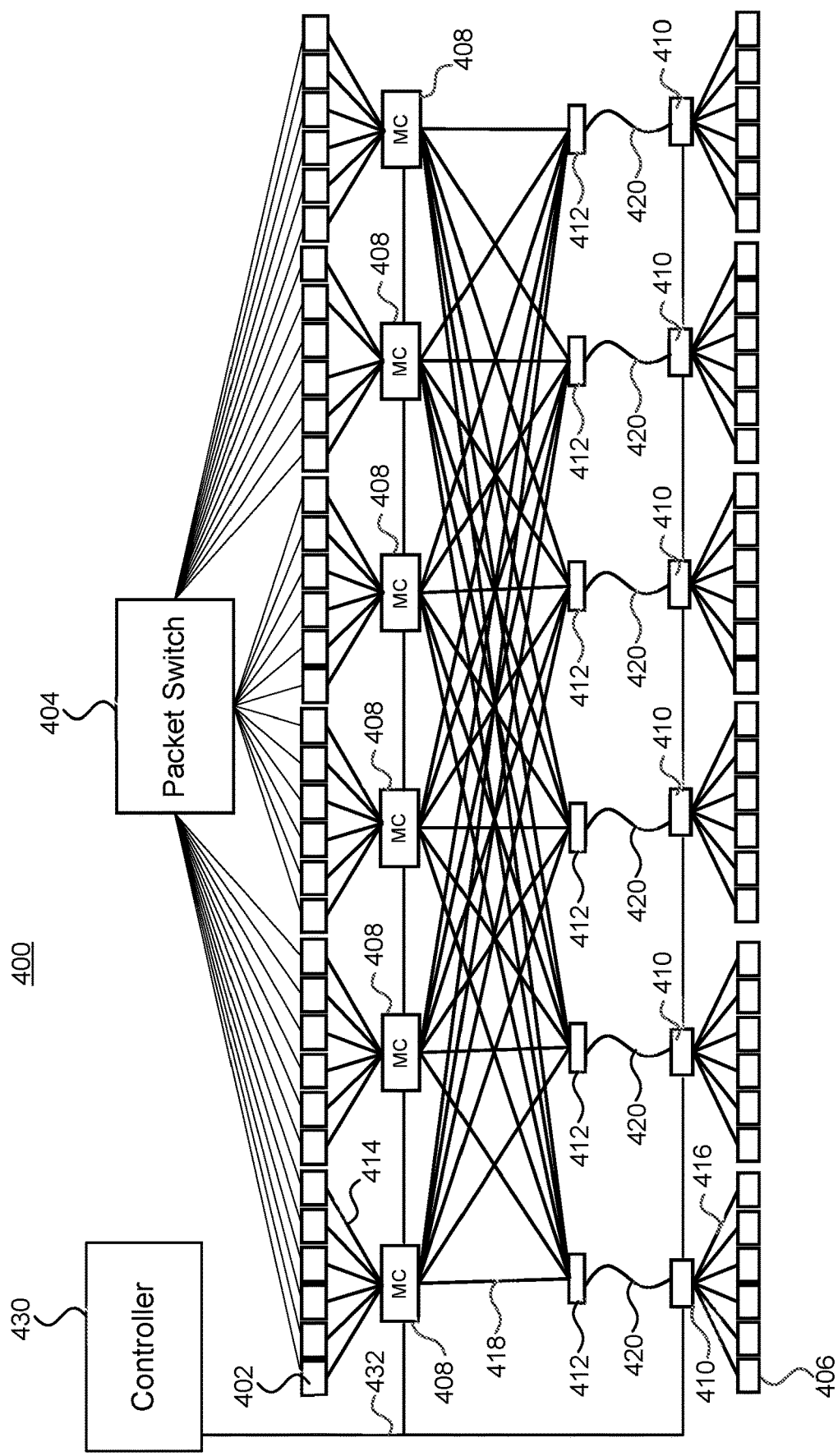
FIG. 4 illustrates another optical network according to one example embodiment.

FIG. 4 illustrates another optical network 400 according to one example embodiment. The optical network 400 includes a plurality of top networking ports 402 (only one of them is labeled for simplicity) coupled to a packet switch 404 and a plurality of bottom networking ports 406 (only one of them is labeled for simplicity). In some embodiments, the packet switch 404 may be replaced by other network devices, such as a router. The top networking ports 402 may be part of a TOR switch or switches, while the bottom networking ports 406 may be ports of servers disposed in a server rack or server racks or ports of one or more other network devices such as a router. The packet switch 404 may be a semiconductor chip configured to route data packets to and from the top networking ports 402. The optical network 400 further includes a plurality of first media converters (MC) 408, a plurality of second media converters 410, and a plurality of optical connectors 412. One end of each first media converter 408 is coupled to a plurality of top networking ports 402 via electrical cables 414 (only one of them is labeled for simplicity), while one end of each second media converter 410 is coupled to a plurality of bottom networking ports 406 via electrical cables 416 (only one of them is labeled for simplicity). Another end of each first media converter 408 is coupled to the optical connectors 412 via optical cables 418 (only one of them is labeled for simplicity). Another end of each second media converter 410 is coupled to one respective optical connector 412 via an optical cable 420. That is, in the illustrated embodiment in FIG. 4, each of the optical connectors 412 is coupled to multiple first media converters 408 and one of the second media converters 410 to connect any one of the first media converters 408 to any one of the second media converters 410.

As shown in FIG. 4, as a non-limiting example, each of the first media converter 408 is coupled to six top networking ports, while each of the second media converter 410 is coupled to six bottom networking ports. The number of components in optical network 400 is not limiting to those in FIG. 4, and may be expanded or reduced based on actual needs. In some implementations, the numbers of the first media converter 408, the second media converter 410, and the optical connectors 412 in the optical network 400 are set to be the same to provide a symmetrical system that is easy to manage and expand.

In a downstream traffic from the packet switch 404 to the bottom networking ports 406, the packet switch 404 is configured to route data packets/signals to respective top networking ports 402. The top networking ports 402 are configured to transmit the signals to the first media converters 408 via the electrical cables 414. Each of the first media converters 408 includes a first ASIC transceiver (e.g., the ASIC transceiver of FIG. 3) configured to convert electrical signals from the top networking ports 402 into optical signals. The optical signals are then transmitted via the optical cable 418 to the optical connectors 412. The optical signals are then routed through the optical connectors 412 and sent to a respective second media converter 410 via the optical cables 420. Each of the second media converters 410 includes a second ASIC transceiver (e.g., the ASIC transceiver of FIG. 3) configured to convert the optical signals it receives from the corresponding optical connector 412 into electrical signals and transmits the electrical signals to respective bottom networking ports 406 via the electrical cables 416.

In an upstream traffic from the bottom networking ports 406 to the packet switch 404, the bottom networking ports 406 initiate transmission of electrical signals to the second media converter 410 via the electrical cables 416. The second ASIC transceiver of the second media converter 410 is configured to convert the electrical signals from the bottom networking ports 406 into optical signals and transmit the optical signals to a corresponding optical connector 412 via the optical cable 420. The optical connectors 412 are configured to route the optical signals to one or more first media converters 408 via the optical cables 418. The first ASIC transceiver of a first media converter 408 is configured to convert the optical signals from the optical connectors 412 into electrical signals and transmit the electrical signals to respective top networking ports 402 via the electrical cables 414. The signals originated from the bottom networking ports 406 are then routed through the packet switch 404 to their destinations, e.g., another bottom networking port 406 in the optical network 400 or an external node.

The optical connectors 412 provide further flexibility for routing signals in the optical network 400. As a non-limiting example, as illustrated in FIG. 4, each of the optical connectors 412 is coupled to all first media converters 408 to establish a communication fabric that enables each of the first media converters 408 (and the top networking ports 402 connected thereto) to connect to any of the second media converters 410 (and the bottom networking ports 406 connected thereto). Each of the optical connectors 412 is configured to aggregate the optical lanes 418 above it into a single parallel optical cable 420.

Figure 5:
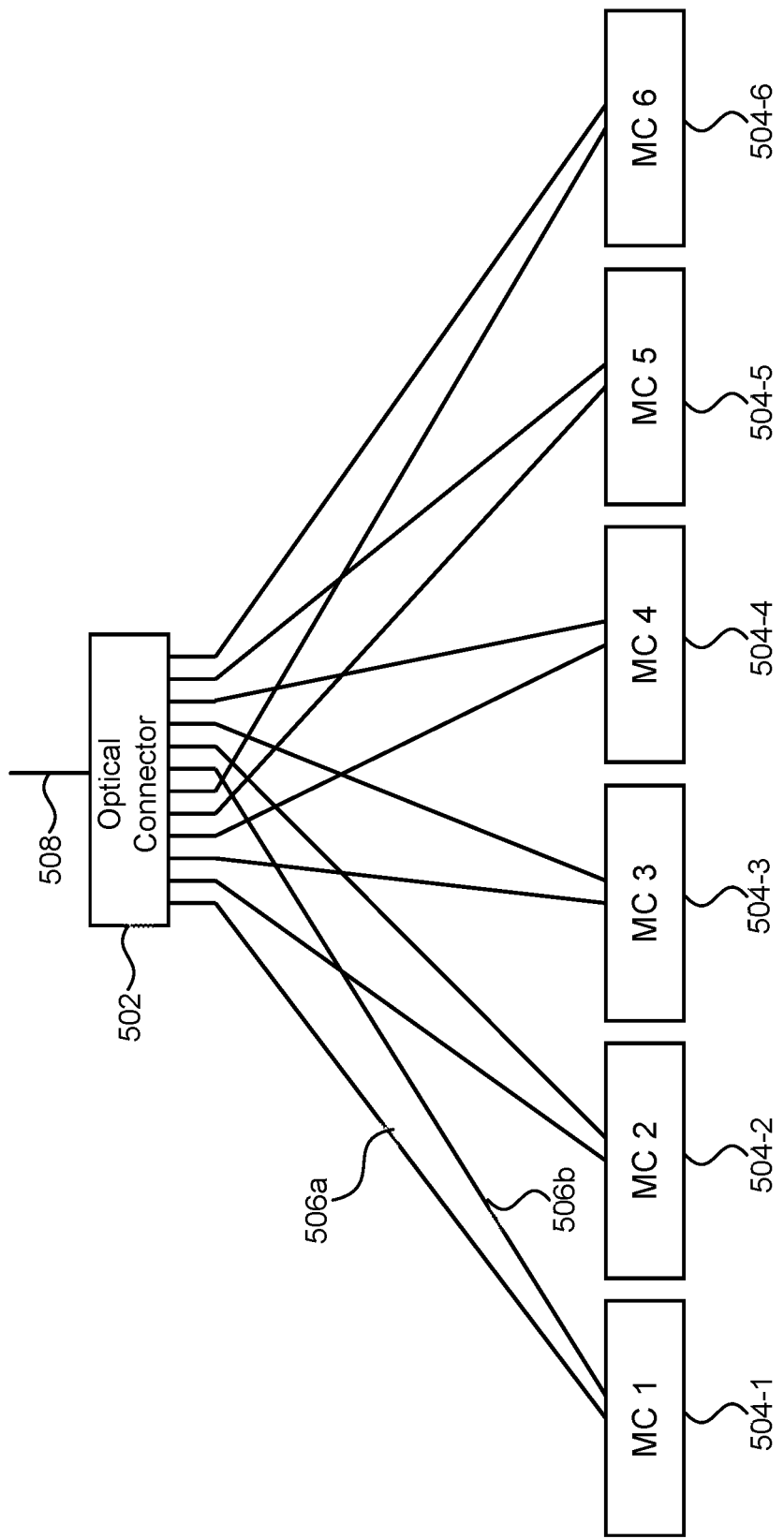
FIG. 5 is a diagram illustrating connections of an optical connector to a plurality of the media converters according to one example embodiment.

FIG. 5 is a diagram illustrating connections of one optical connector 502 to a plurality of the media converters (MC) 504 (labeled as 504-1, 504-2, 504-3, 504-4, 504-5, 504-6). The optical connector 502 has one input port and output port coupled to each of the media converter 504 via one input optical cable 506a and one output optical cable 506b (only one pair of optical cables 506a and 506b is labeled for simplicity). In some embodiments, each of the optical cables 506a and 506b are capable of hosting at least 4 wavelengths, representing 4 electrical links/channels connected to another end of the media converters 504 and resulting in a quad port connection for each of the optical cables 506a and 506b. In some embodiments, the optical connector 502 may be a Multi-fiber Push On (MPO) optical connector. In the illustrated example, the optical connector 502 aggregates 12 fibers into a single parallel fiber bundle 508.

Referring back to FIG. 4, each of the first ASIC transceivers of the first media converters 408 and the second ASIC transceivers of the second media converters 410 has a circuit switch function as described in connection with FIG. 3. The circuit switch function allows the first ASIC transceiver and the second ASIC transceiver to transmit a signal from one of the top networking ports 402 to any one of the bottom networking ports 406, and transmit a signal from one of the bottom networking ports 406 to any one of the top networking ports 402. To control the first ASIC transceiver and the second ASIC transceiver to perform circuit switch, the optical network 400 further includes a controller 430 coupled to each of the first media converters 408 and the second media converters 410. In some embodiments, the controller 430 is configured to communicate with the first media converters 408 and the second media converters 410 via $I^2C$ buses 432. Other communication protocols are contemplated. The controller 430 may be coupled to each of the first media converters 408 and the second media converters 410 in series as shown in FIG. 4 or in parallel (i.e., each of the first media converters 408 and the second media converters 410 is coupled to the controller 430 independently).

The controller 430 may obtain system information as basis to control the first ASIC transceiver and the second ASIC transceiver to perform circuit switch. For example, the system information may indicate whether any portion of the optical network 400 is out of service because of node, link, or component failures, or bandwidth needs of the nodes (e.g., the bottom networking ports 406). The system information may be collected by the controller 430 from all components of the optical network 400. These techniques disclosed herein provide better flexibility in routing signal packets or for failover cushion. For example, when one of the top networking ports 402 is out of service, the signals from the bottom networking ports 406 handled by the out-of-service switch port may be switched by the first ASIC transceiver of a first media converter 408 to another switch port. As another non-limiting example, when one of the electrical cables 414 is disconnected, the signals from the bottom networking ports 406 that should be transmitted to a switch port via the disconnected electrical cable may be switched by the first ASIC transceiver of the first media converter 408 to another switch port via a different electrical cable 108. In some embodiments, to perform the pin swap/ circuit switch, connections are first stopped; the first media converters 408 and the second media converters 410 are reset; optical paths are reallocated by the first ASIC transceivers and/or the second ASIC transceivers based on instructions from the controller 430; the optical links are retrained; and then connections are resumed.

Figure 6A:
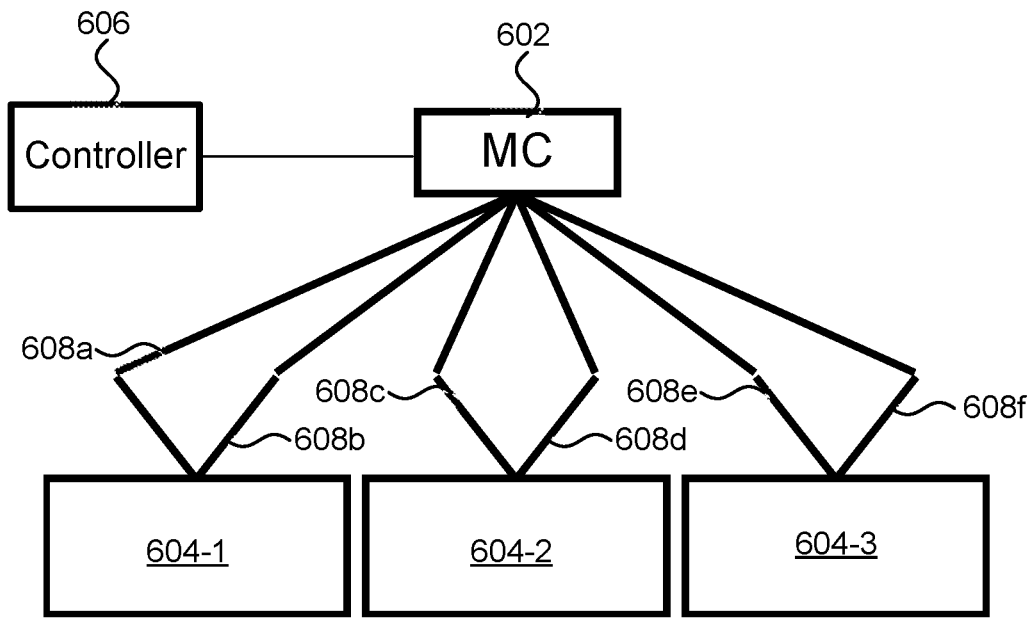
FIG. 6A illustrates a bandwidth allocation technique applied to a media converter and three endpoints according to one example embodiment.

The circuit switch function of the first ASIC transceivers and the second ASIC transceivers may be invoked to allocate and re-allocate bandwidth for the top networking ports 402 and/or the bottom networking ports 406. Reference is now made to FIG. 6A. FIG. 6A illustrates a bandwidth allocation technique applied to a media converter 602 and three endpoints 604 (labeled 604-1, 604-2, 604-3) according to one example embodiment. The endpoints 604 may be bottom networking ports or top networking ports as those shown in FIGS. 1 and 4. The media converter 602 is coupled to a controller 606 to receive instructions from the controller 606. For example, during the boot up of the network that includes the media converter 602 and the endpoints 604, by default the controller 606 may be configured to instruct the media controller 602 to allocate even bandwidth to each of the end points 604. Each of the links 608 (labeled as 608a, 608b, 608c, 608d, 608e, and 608f) in FIG. 6A represents a unit of bandwidth. As a non-limiting example, each of the links 608 is 200 Gb/s, and each of the endpoints 604 are allocated with 400 Gb/s of bandwidth. In some embodiments, each of the endpoints 604 may be equipped with a QSFP-DD or QSFP56 module that can support the bandwidth allocation.

Figure 6B:
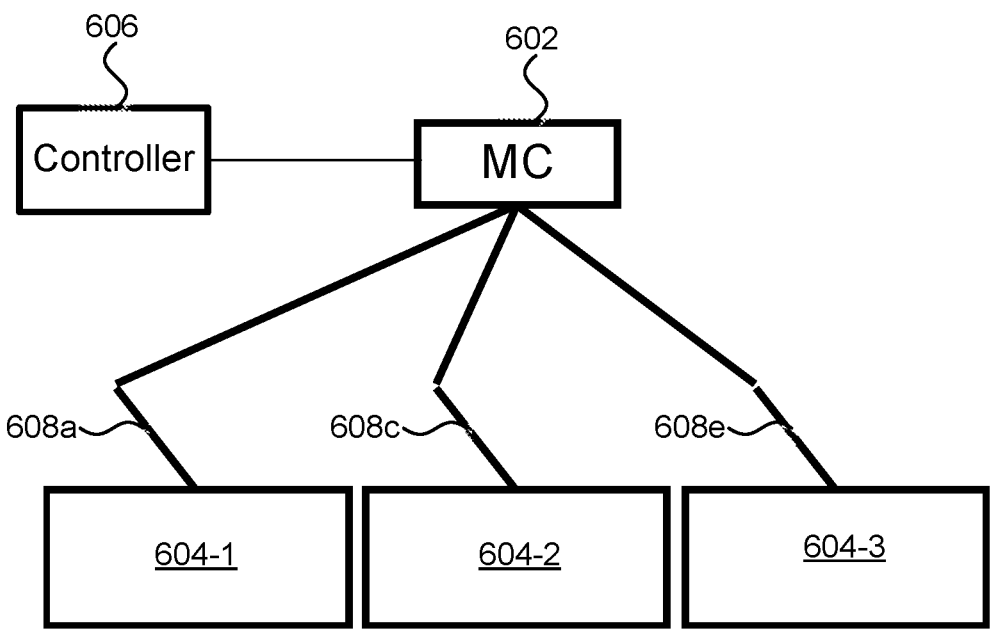
FIG. 6B illustrates another bandwidth allocation technique applied to a media converter and three endpoints according to one example embodiment.

FIG. 6B illustrates another bandwidth allocation technique applied to the media converter 602 and the endpoints 604 according to one example embodiment. In this embodiment, the controller 606 is configured to control the media converter 602 to reduce bandwidth to each of the endpoints 604. For example, following the embodiment in FIG. 6A, each of the endpoints 604 is re-allocated to have one link instead of two links 608 such that each endpoint can use up to 200 Gb/s for communication. In some instances, reducing bandwidth to the endpoints 604 may be in response to a detection that some of the endpoints 604 do not need as much bandwidth as originally allocated or some bandwidth in the optical network is out of service or due for maintenance.

Figure 6C:
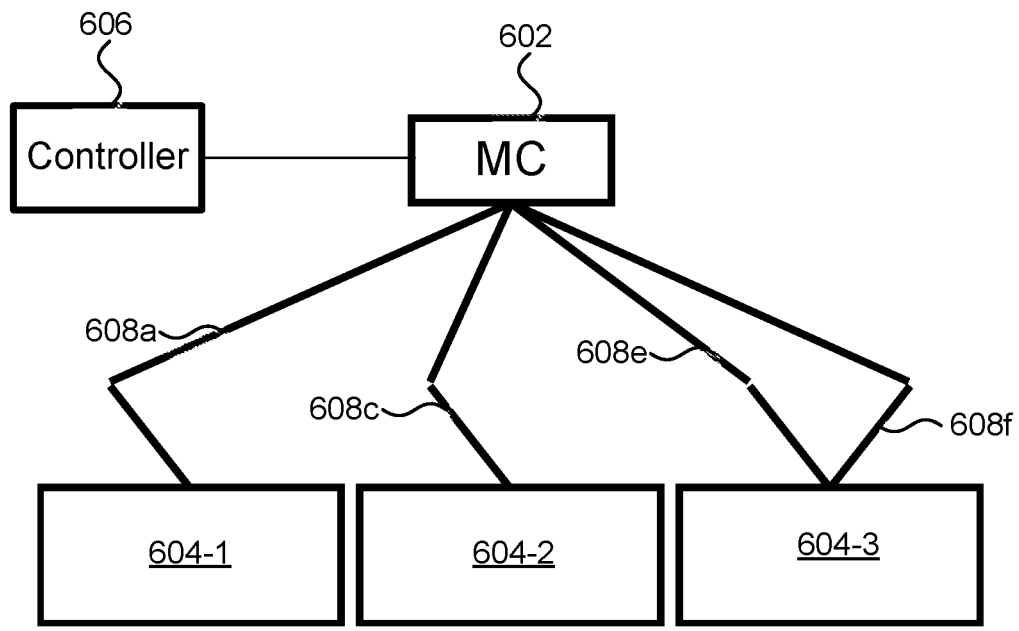
FIG. 6C illustrates yet another bandwidth allocation technique applied to a media converter and three endpoints according to one example embodiment.
Figure 6D:
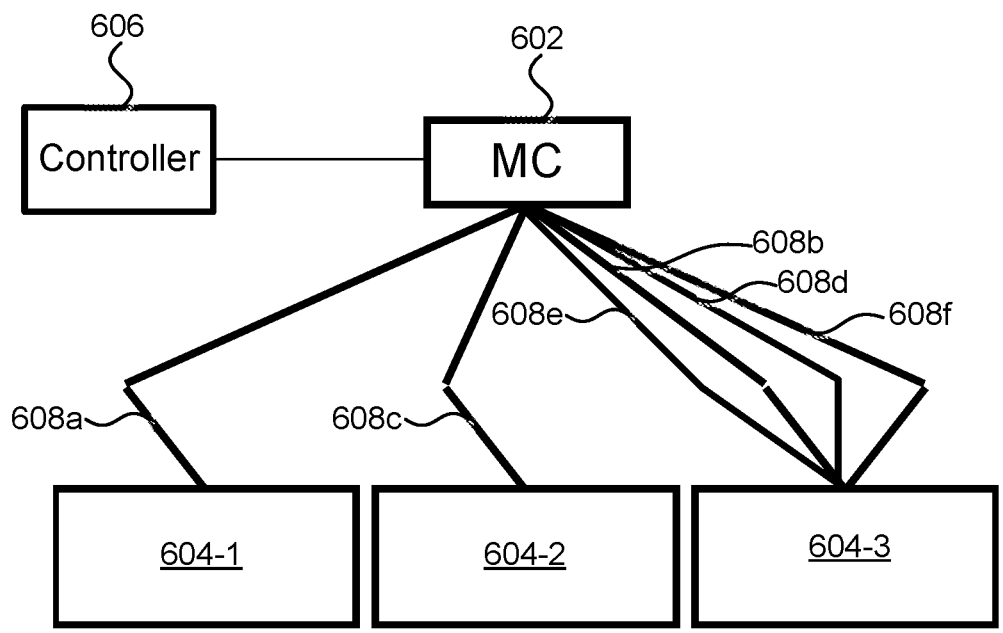
FIG. 6D illustrates yet another bandwidth allocation technique applied to a media converter and three endpoints according to one example embodiment.

Other re-allocation techniques may be implemented. For example, the media converter 602 may disconnect one or both of the links 608 initially allocated to the endpoints 604-1, and re-allocate the links to endpoint 604-2 and/or endpoints 604-3. An example is illustrated in FIG. 6C. In FIG. 6C, the endpoints 604-1 and 604-2 are each allocated one link 608a and 608c, respectively, while the endpoint 604-3 is allocated two links 608e and 608f. Referring to FIG. 6D, as another non-limiting example, the endpoints 604-1 and 604-2 are each allocated one link 608a and 608c, respectively, while the endpoint 604-3 is allocated fourth links 608b originally of end point 604-1, 608d originally of endpoint 604-2, 608e, and 608f. The allocation and re-allocation decisions may be determined by the controller 606 based on the needs of the endpoints and bandwidth availability.

Figure 7:
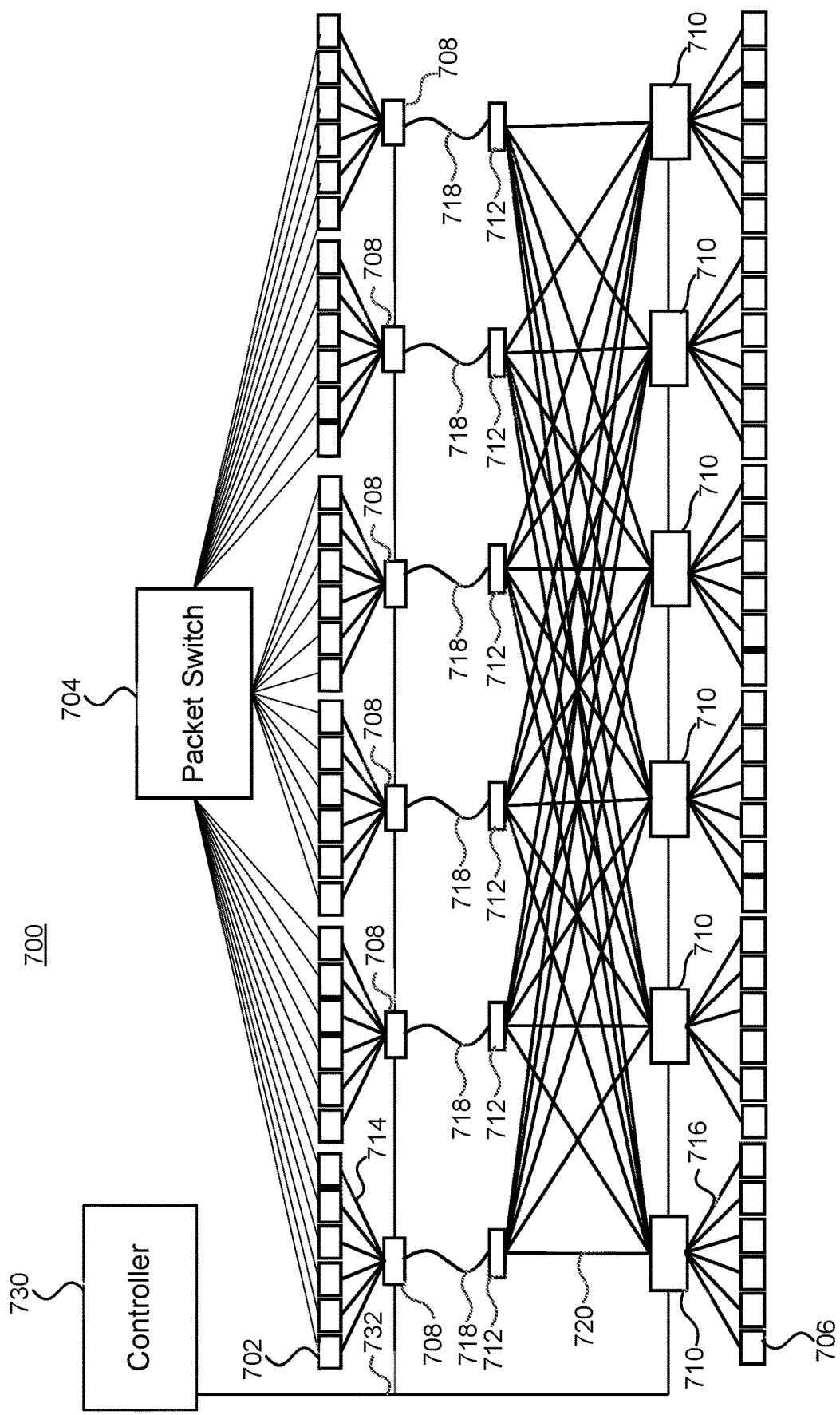
FIG. 7 illustrates another optical network according to one example embodiment.

FIG. 7 illustrates another optical network 700 according to one example embodiment. The optical network 700 includes a plurality of top networking ports 702 (only one of them is labeled for simplicity) coupled to a packet switch 704 and a plurality of bottom networking ports 706 (only one of them is labeled for simplicity). In some embodiments, the packet switch 404 may be replaced by other network devices, such as a router. The optical network 700 further includes a plurality of first media converters 708, a plurality of second media converters 710, and a plurality of optical connectors 712. One end of each of the first media converters 708 is coupled to a plurality of top networking ports 702 via electrical cables 714 (only one of them is labeled for simplicity), while one end of each of the second media converter 710 is coupled to a plurality of bottom networking ports 706 via electrical cables 716 (only one of them is labeled for simplicity). Another end of the each of the first media converters 708 is coupled to one corresponding optical connector 712 via an optical cable 718. Another end of each of the second media converter 710 is coupled to a plurality of optical connector 712 via optical cables 720 (only one of them is labeled for simplicity). That is, in the illustrated embodiment in FIG. 7, each of the optical connectors 712 is coupled to one of the first media converters 708 and multiple second media converters 710 to connect any one of the first media converters 708 to any one of the second media converters 710.

The optical network 700 further includes a controller 730 coupled to each of the first media converters 708 and the second media converters 710. In some embodiments, the controller 730 is configured to communicate with the first media converters 708 and the second media converters 710 via I²C buses 732. Other communication protocols are contemplated. The controller 730 may be coupled to each of the first media converters 708 and the second media converters 710 in series as shown in FIG. 7 or in parallel (i.e., each of the first media converters 708 and the second media converters 710 is coupled to the controller 730 independently). The functions of the components in the optical network 700 are similar to those in FIG. 4 and can be referred to above.

Figure 8:
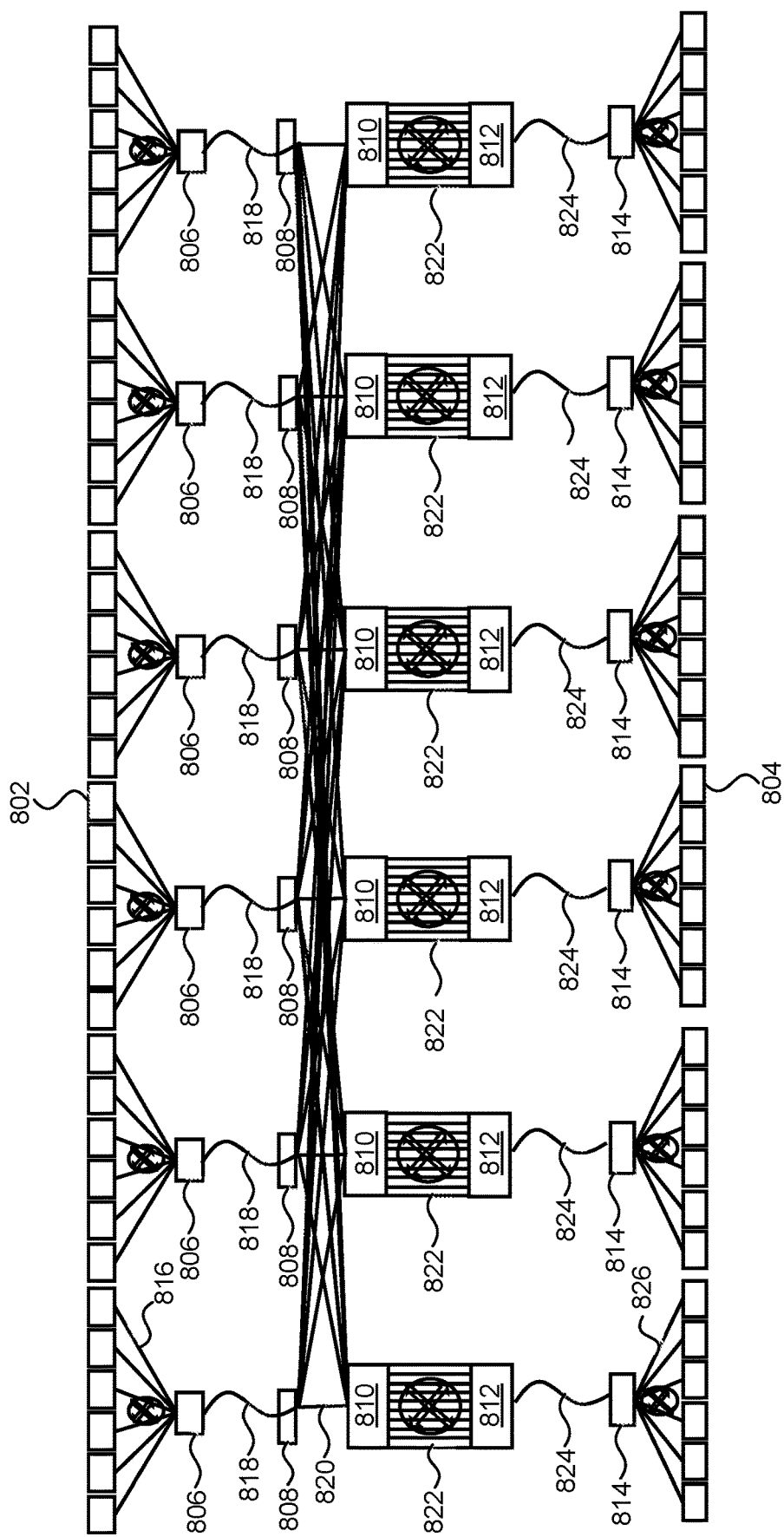
FIG. 8 illustrates yet another optical network according to one example embodiment.

FIG. 8 illustrates another optical network 800 according to one example embodiment. The optical network 800 includes a plurality of top networking ports 802 (only one of them is labeled for simplicity) and a plurality of bottom networking ports 804 (only one of them is labeled for simplicity). The optical network 800 further includes a plurality of first media converters 806, a plurality of optical connectors 808, a plurality of second media converters 810, a plurality of third media converters 812, and a plurality of fourth media converters 814. An upper end of each of the first media converters 808 is coupled to a plurality of top networking ports 802 via electrical cables 816 (only one of them is labeled for simplicity). The lower end of each of the first media converters 808 is coupled to an optical connector 808 via an optical cable 818. The lower end of each optical connector 808 is coupled to a plurality of second media converters 810 via optical cables 820 (only one of them is labeled for simplicity). The lower end of each second media converter 810 is coupled to an upper end of a corresponding third media converter 812 via optical cables 822. The lower end of each third media converter 812 is coupled to an upper end of a corresponding fourth media converter 814 via an optical cable 824. The lower end of each fourth media converter 814 is coupled to a plurality of bottom networking ports 804 via electrical cables 826 (only one of them is labeled for simplicity). The architecture of the optical network 800 provides three switch planes as identified by cross-bar signs between the top networking ports 802 and the first media converters 806, between the second media converters 810 and the third media converters 812, and between the fourth media converts and the bottom networking ports 804. This architecture provides further flexibility to route data in the optical network 800. In some embodiments, instead of interposing the optical connectors 808 between the first media converters 806 and the second media converters 810, the optical connectors 808 may be interposed between the third media converters 812 and the fourth media converters 814.

In summary, the techniques disclosed herein provides a simple distributed switch architecture that can be deployed to optical networks and applied to any topology to accommodate changes for managing the optical networks. This distributed switch demonstrates viability of circuit switching as the controller can be configured to allocate and re-allocate bandwidth to endpoints or control pin swap/circuit switch to re-route signals to avoid faulty links or network components. The switch architecture connects racks of servers to a set of media converters that include circuit switch functions. Further, the switch architecture connects another set of media converters to the ports of the TOR switches, and provides optical connections between those two sets of media converters. A shuffle including optical connectors (e.g., the optical connectors 412 in FIG. 4, the optical connectors 712 in FIG. 7, the optical connectors 808 in FIG. 8) allows each media converter on the switch end to reach each media converter on the server end. A destination-end media converter converts the incoming optical signals to electrical signals for QSFP cables which are plugged into respective servers. Each server can be configured for the full (e.g., 4 lanes), half (e.g., 2 lanes), or one-fourth (e.g., 1 lane) QSFP bandwidth. The media converters reconfigure which specific server lane is connected to a specific switch port, resulting in flexible bandwidth for the servers which may enable that every lane of a switch is in use. In contrast, the conventional architecture is rigid and needs extensive labor to re-arrange cables for adjusting bandwidth for the nodes.

The disclosed optical network enables flexible bandwidth allocation to selected servers. A server could request extra bandwidth during a network intensive operation, such as virtual machine migration, downloading data, or backup. In some embodiments, each media converter is connected to a number of quad-lane switch connectors (e.g., the optical connectors 412 in FIG. 4, the optical connectors 712 in FIG. 7, the optical connectors 808 in FIG. 8). Each connector can be pre-configured as one port with 4 lanes, two ports each with 2 lanes, or four ports each with one lane, enabling the media converter to offer a mix of ports having quad lanes, two lanes, and single lane.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical network, comprising:
a plurality of top networking ports coupled to a packet switch;
one or more first media converters coupled to the plurality of top networking ports, each of the one or more first media converters including a first ASIC transceiver configured to convert electrical signals from the plurality of top networking ports into optical signals, wherein the first ASIC transceiver has a circuit switch function;
one or more second media converters coupled to the one or more first media converter via one or more optical cables to receive the optical signals, each of the one or more second media converters including a second ASIC transceiver configured to convert the optical signals to electrical signals, wherein the second ASIC transceiver has a circuit switch function; and
a plurality of bottom networking ports coupled to the one or more the second media converters;

a controller connected to each of the one or more first media converters and each of the one or more second media converters, wherein the controller is configured to control the second ASIC transceiver allocation bandwidth to the plurality of bottom networking ports such that bandwidth for a first one of the plurality of bottom networking ports is different from bandwidth for a second one of the plurality of bottom networking ports.

2. The optical network of claim 1, wherein:
the one or more first media converters includes a first plurality of first media converters, and the one or more second media converters includes a second plurality of second media converters, wherein the first plurality is equal to the second plurality.

3. The optical network of claim 2, further comprising:
a third plurality of optical connectors disposed between the first media converters and the second media converters.

4. The optical network of claim 3, wherein each of the optical connectors is coupled to the first plurality of first media converters and one of the second plurality of second media converters.

5. The optical network of claim 4, wherein the third plurality is equal to the first plurality or the second plurality, and the optical connectors connect any one of the first media converters to any one of the second media converters.

6. The optical network of claim 3, wherein each of the optical connectors is coupled to one of the first plurality of first media converters and the second plurality of second media converters.

7. The optical network of claim 6, wherein the third plurality is equal to the first plurality or the second plurality, and the optical connectors connect any one of the first media converters to any one of the second media converters.

* * * * *